(12) United States Patent
Goedken et al.

(10) Patent No.: US 8,641,074 B2
(45) Date of Patent: Feb. 4, 2014

(54) OSCILLATING KINGPIN STRUCTURE FOR GRAIN TRAILER

(71) Applicant: Kann Manufacturing Corporation, Guttenberg, IA (US)

(72) Inventors: Kenneth D. Goedken, Dubuque, IA (US); Marlin L. Johnson, Guttenberg, IA (US); Jared L. Rowland, Dyersville, IA (US)

(73) Assignee: Kann Manufacturing Corporation, Guttenberg, IA (US)

( * ) Notice: Subject to any disclaimer, the term of this patent is extended or adjusted under 35 U.S.C. 154(b) by 0 days.

(21) Appl. No.: 13/623,964

(22) Filed: Sep. 21, 2012

(65) Prior Publication Data

US 2013/0069340 A1 Mar. 21, 2013

Related U.S. Application Data

(60) Provisional application No. 61/537,262, filed on Sep. 21, 2011.

(51) Int. Cl.
*B62D 53/08* (2006.01)

(52) U.S. Cl.
USPC .................................. 280/438.1; 280/407

(58) Field of Classification Search
USPC ............................................. 280/438.1
See application file for complete search history.

(56) References Cited

U.S. PATENT DOCUMENTS

| | | | | |
|---|---|---|---|---|
| 3,899,194 | A * | 8/1975 | Breford | 280/438.1 |
| 4,955,631 | A * | 9/1990 | Meyer | 280/438.1 |
| 6,877,757 | B2 * | 4/2005 | Hayworth | 280/438.1 |
| 7,516,974 | B1 * | 4/2009 | Mann et al. | 280/433 |

* cited by examiner

*Primary Examiner* — Tony Winner
(74) *Attorney, Agent, or Firm* — Allan L. Harms; Shuttleworth & Ingersoll, PLC

(57) ABSTRACT

A rocking trailer kingpin assembly for a grain trailer constructed of aluminum or light weight steel includes an upper subframe mounted to the trailer body with a pivotable lower subframe hinged to the upper subframe. The lower subframe includes a skid plate from which a kingpin extends such that the kingpin can be received in the fifth wheel coupling of a truck tractor.

3 Claims, 4 Drawing Sheets

OSCILLATING KINGPIN STRUCTURE FOR GRAIN TRAILER

CROSS REFERENCE TO RELATED APPLICATIONS

This application claims priority under 35 USC §119 from copending provisional patent application entitled OSCILLATING KINGPIN STRUCTURE FOR GRAIN TRAILER, Ser. No. 61/537,262, filed Sep. 21, 2011. The disclosures of provisional patent application Ser. No. 61/537,262 are hereby incorporated in their entireties.

BACKGROUND

The conventional grain trailer is equipped with a pin extending downward from the trailer underbody which is fixed to the trailer frame. This pin is received in a fifth wheel coupling on a towing, tractor truck. On usual street surfaces, the traditional tractor-trailer kingpin coupling is quite satisfactory. However, when the trailer is pulled on uneven surfaces large stresses are experienced by the kingpin and its solid mounting to the trailer underbody frame.

As fuel costs have risen, efforts to reduce operation costs for grain trucking activities have led to grain hauling trailers being designed which can be manufactured from lighter weight materials, particularly aluminum and light weight steel. When aluminum or light weight steel are used for grain trailer bodies, the mounting of the kingpin to the frame is unable to stand up to the stresses on the mounting when the trailer is pulled over uneven surfaces, particularly over grain fields, where grain trailers are often used. Twisting forces on the trailer body as it is towed over a grain field tends to heavily stress the trailer's structure, particularly when the trailer's kingpin is solidly fixed to the body. The stresses from such twisting are less well tolerated when aluminum or light weight steel is used in the stricture or when the trailer body is assembled by use of rivets instead of welding. Therefore, to afford improved fuel economy through reduction in trailer weight while maintaining the useful life of the trailer, development of structure to reduce the twisting stresses on the trailer body has been needed.

SUMMARY OF THE INVENTION

The present invention provides an improved kingpin assembly for mounting to a trailer, particularly to a grain trailer constructed of aluminum or light weight steel which is pulled over uneven surfaces such as a crop field. The kingpin assembly includes a steel upper subframe which mounts to the underside of the grain trailer at the front end of the trailer, the existing kingpin post of the trailer having been removed. A steel lower subframe is hinged to the upper subframe and a kingpin extends downward from a skid plate of the lower subframe. The kingpin can be received in the fifth wheel receiver on a truck tractor used to tow the trailer.

The lower subframe is hinged to the upper subframe by axle members which link upstanding frame elements of each of the upper and lower subframes. Resilient bumper elements are mounted to the upper surface of the lower subframe which cushion the abutment of the lower subframe to the underside of the trailer as the kingpin assembly rocks as the trailer passes over uneven ground surfaces.

It is a primary object of the invention to provide an improved kingpin assembly for a grain trailer constructed of aluminum or light weight steel, to allow the grain trailer to rock relative to the truck tractor pulling it without overstressing the kingpin inserted within the fifth wheel hitch of the truck tractor.

It is a further object of the invention to provide an improved aluminum grain trailer which can withstand twisting forces occurring when the trailer is towed over uneven ground surfaces.

It is still a further object of the invention to provide an improved grain trailer which allows rocking of the trailer relative to a truck tractor to which it is coupled by a kingpin inserted in the fifth wheel hitch of the truck tractor.

These and other desirable objects of the invention will be understood from reference to the drawings and to the detailed description of this specification.

DETAILED DESCRIPTION

The present invention provides a solution to reduce mechanical stresses on the kingpin and underbody frame structure of a grain trailer to be towed by a truck tractor equipped with a fifth wheel coupling, especially when the grain trailer is towed over an uneven surface such as a crop field. More particularly, this invention is useful when the frame structure of the grain trailer is constructed of aluminum or light weight steel.

Figure 1:
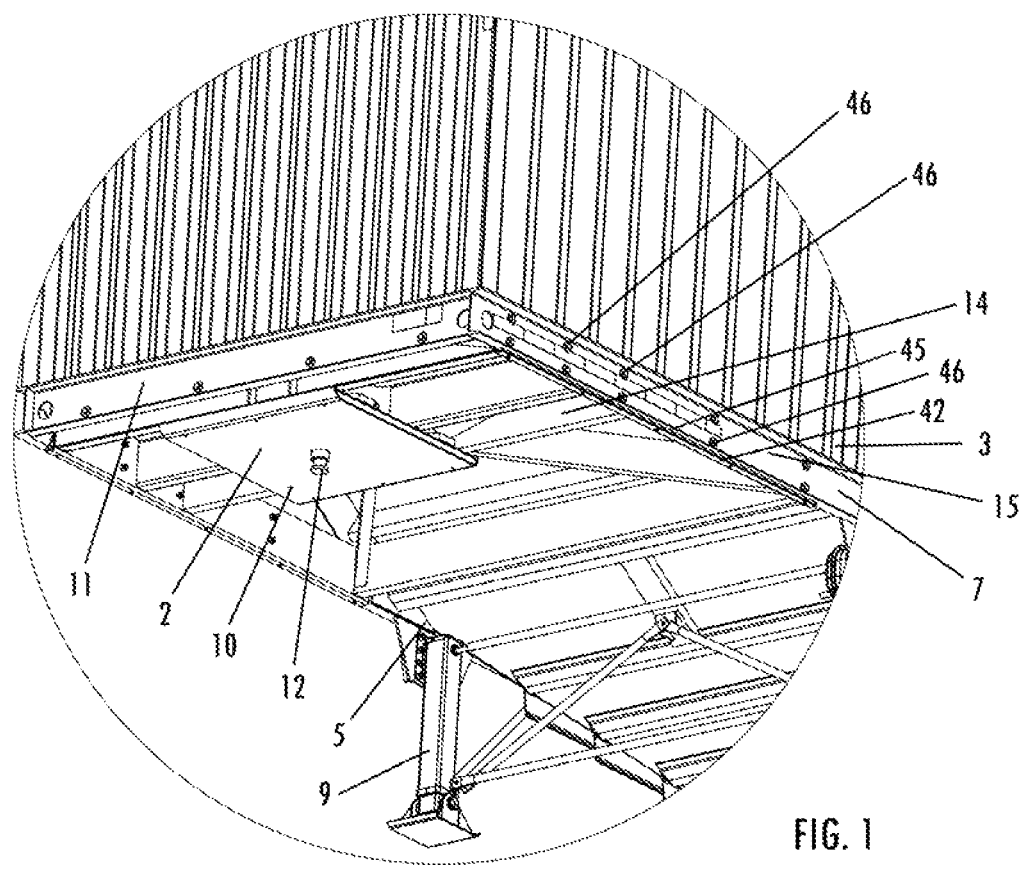
FIG. 1 is an enlarged perspective of a front portion of the underside of a grain transporting trailer equipped with the invention.

FIG. 1 illustrates the kingpin structure 2 mounted to the underbody 5 of a grain transporting trailer 3. The kingpin structure 2 comprises a lower mourning plate 10 to which the kingpin 12 is securely mounted. The lower mounting plate 10 is moveably secured to an upper mounting subframe 14 which is bolted to the underbody 5 of trailer 3. The upper mounting subframe 14 is received within the main frame 7 of the trailer 3 forward of the landing gear 9 spaced a short distance behind the from wall 11 of the trailer frame 7. A spacer 45 is sandwiched between lips 42 and frame 7. Kingpin structure 2 is preferably made of steel.

Figure 2:
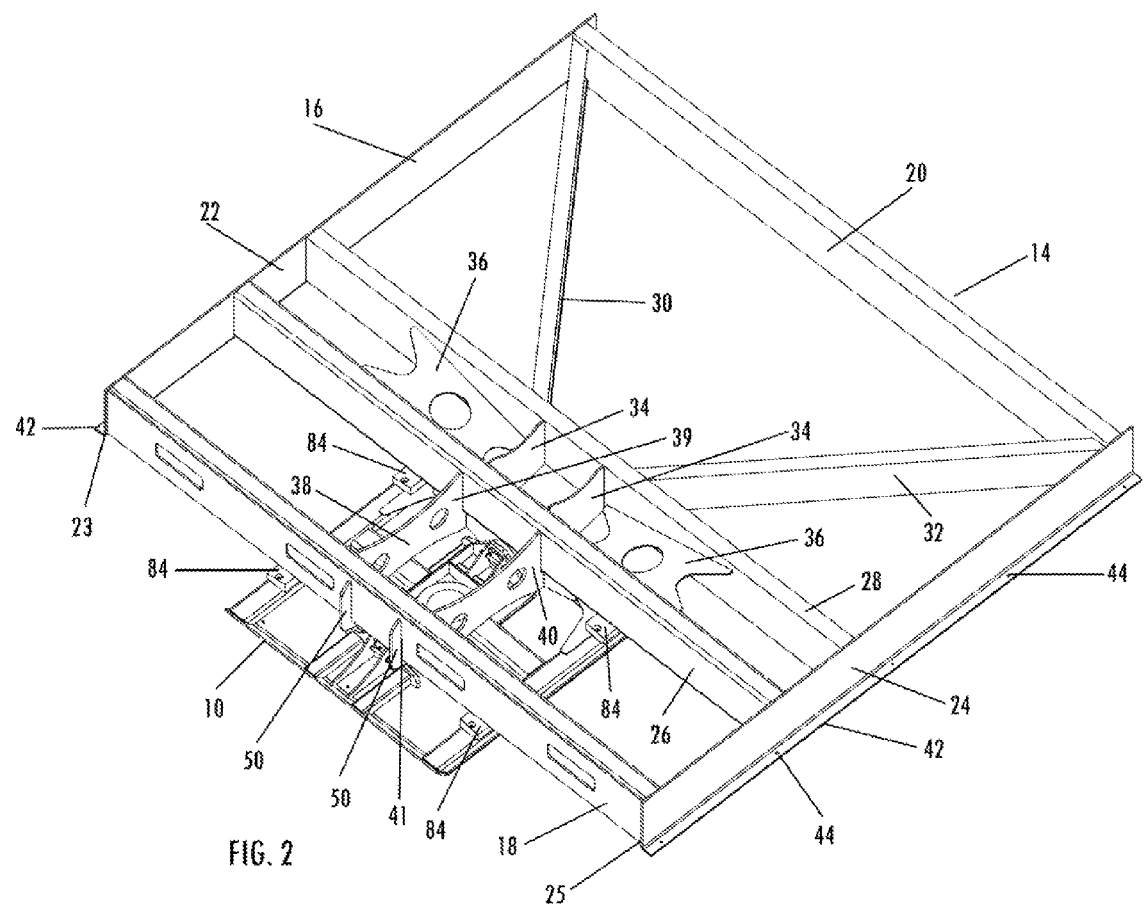
FIG. 2 is a top perspective of the invention.
Figure 3:
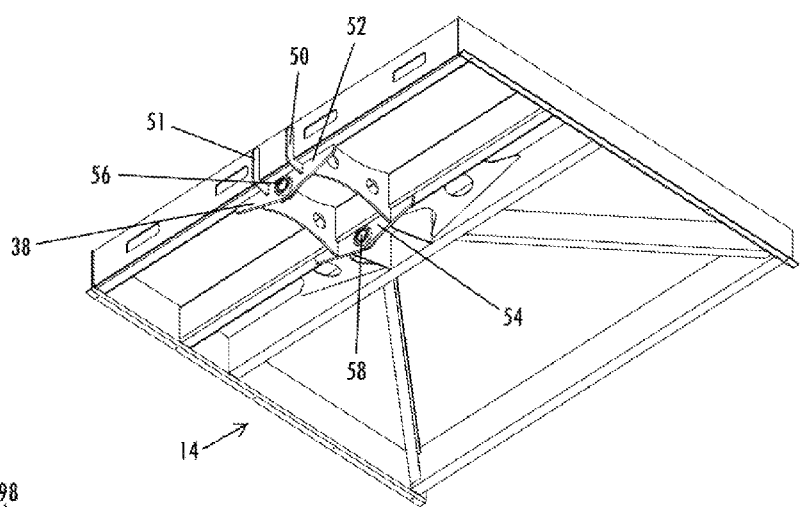
FIG. 3 is a bottom perspective of the upper subframe member of the invention.

Referring now additionally to FIGS. 2-3, it can be observed that upper subframe 14 comprises an open rectangular frame 16 including front end wall 18 and rear end wall 20 joined by opposing first and second sidewalls 22, 24. First transverse rib 26 and second transverse rib 28 interconnect sidewalk 22, 24 and are substantially parallel to end walls 18, 20. Diagonal brace members 30, 32 join rear end wall 20 to second intermediate rib 28. Struts 34, 36 provide rigid separation of second transverse rib 28 from first transverse rib 26.

Secured between front end wall 18 and first transverse rib 26 is pivot support 38 which is generally centered between side walls 22, 24 and includes rib braces 39, 40 which also maintain rigid, separation of first intermediate rib 26 from front end wail 18.

Each side wall 22, 24 is provided with a lip 42 running the length thereof, extending outwardly from the lower ends 23, 25 respectively of side walls 22, 24. Openings 44 are spaced along the lengths of lips 42 to receive fasteners to secure a strip of nylon or plastic to each lip 42 as spacer 45 between the subframe 14 and frame 7 in order to reduce corrosion potential between the steel of subframe 14 and the aluminum of trailer frame 7.

Subframe 14 is retained to trailer frame 7 through use of lateral bolts 46 (See FIG. 1) which are passed through the skirt 15 of frame 7 and into sidewalls 22, 24 of upper subframe 14. Holes for lateral bolts 46 are made at time of installation. Subframe 14 is positioned with its front end wall 18 spaced away from front wall 11 of skirt 15 of trailer frame 7.

A first hinge element, pivot support 38, is welded to first intermediate rib 26 and to front end wall 18 including at attachment legs 50. Each attachment leg 50 is part of a side brace 39, 40, the side braces 39,40 each including receiving slot 41 into winch front wall 18 resides, with attachment legs 50 disposed on the outside of front wall 18. Side braces 39, 40 and the attachment legs 50 thereof are securely welded to opposing sides of the front wall 18 while side braces 39, 40 are each also welded to intermediate rib 26. Pivot support 38 includes front and rear bearing support plates 52, 54 which include pivot bearings 56, 58 therein. Bearing support plates 52, 54 are aligned in the same plane with front wall 18 and first intermediate rib 26 respectively.

Figure 4:
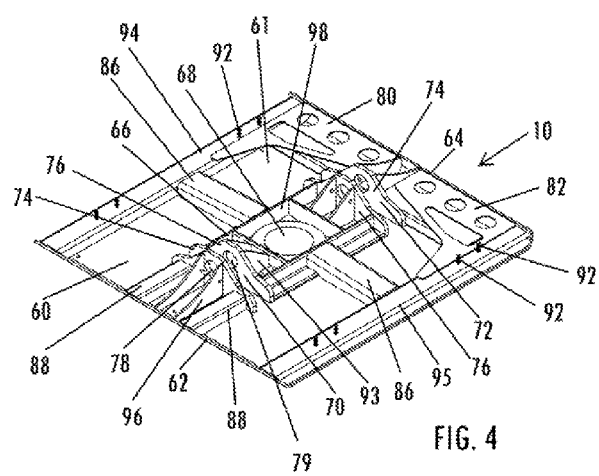
FIG. 4 is a top perspective of the lower plate member of the invention.

Referring now to FIG. 4, the lower mounting plate 10 is rectangular, preferably square, and includes an underside skid plate 60 having upturned front and rear edges 62, 64. On the top surface 61 of skid plate 60 is securely mounted second hinge structure 66 which comprises front and rear axle receivers 70, 72 which are identical and arranged with on mirroring the other. Each axle receiver 70, 72 comprises a pair of closely spaced apart upstanding arched plates 74, 76 having axle openings 78 therethrough. Each axle receiver 70, 72 is welded to top surface 61 of skid plate 60 on an opposing side of kingpin receiver 68 which is generally centered on lower mounting plate 10. Kingpin receiver 68 may be internally threaded to receive kingpin 12.

Kingpin receiver 68 is surrounded by reinforcing structure 98 which in the preferred embodiment of FIG. 4 comprises an upstanding box and gusset brackets 93 joining the inner arched plates 76.

Outer curved plates 74 are reinforced by outrigger gusset brackets 81. Gusset plates 80, 82 provide rigidity to the rear corners of lower plate 10. Robust stop bumpers 84 (See FIGS. 2, 5-6) are mounted to lower plate 10 and are disposed to abut the underside of front end wall 18 and the first intermediate rib 26 when lower mounting plate 10 rocks about axles 90 which are receivable in each pair of axle openings 78, 79. Pins 92 are provided on longitudinal side reinforcing ribs 94, 95 to provide mounting elements to receive the stop bumpers 84.

Second hinge structure 66 also includes transverse ribs 86 and longitudinal frame members 88 which are welded to the top of skid plate 60.

Second hinge structure 66 also includes transverse ribs 86 and longitudinal frame members 88 which are welded to the top surface 61 of skid plate 60.

Each axle receiver 70, 72 surrounds a bearing support plate 52, 54 respectively when lower mounting plate 10 is raised to the underside of upper subframe 14 and axle openings 78, 79 are aligned with pivot bearings 56, 58. An axle 90 may be inserted through each set of axle receiver 70, 72 and each pivot bearing 56, 58 respectively to retain bearing plates 52, 54 to axle receivers 70, 72 such that lower plate 10 may pivot over a limited range on upper subframe 14. When assembled to subframe 14, a portion of lower plate 10 extends forward of front end wall 18 such that kingpin receiver 68 is disposed below the space between front end wall 18 and first intermediate rib 26 of upper subframe 14.

Axles 90 are coaxial and parallel to the longitudinal centerline of the trailer frame 7.

Figure 5:
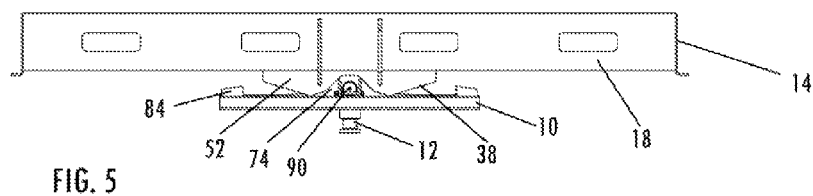
FIG. 5 is a front elevation of the invention at rest.
Figure 6:
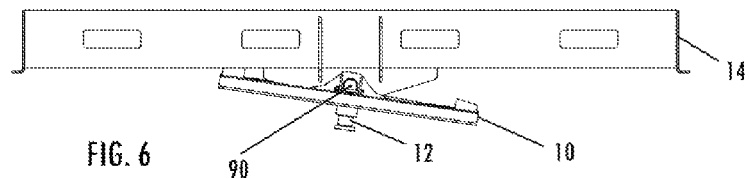
FIG. 6 is an elevation of the invention tilted in a first direction.
Figure 7:
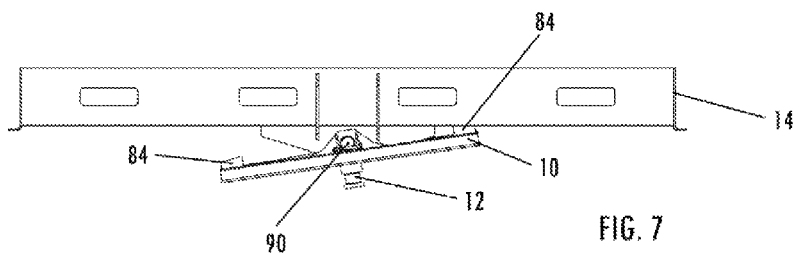
FIG. 7 is an elevation of the invention tilted in a second direction.

Referring now to FIGS. 5-7, the oscillating range of kingpin structure 2 is shown with illustrations how lower mounting plate 10 and kingpin 12 rock relative to the upper subframe 14. Lower plate 10 is allowed to rock around pivot axles 90 to the extent that nylon stop bumpers 84 abut the from wall 18 and first intermediate rib 26 to prevent further rotation of lower plate 10 about axles 90. Therefore, the trailer 3 is free to rock relative to the fifth wheel hitch of the truck tractor when the trailer and truck tractor pass over uneven surfaces while joined.

While the present invention has been particularly shown and described with reference to exemplary embodiments thereof, it should be understood by those of ordinary skill in the art that various changes, substitutions and alterations can be made herein without departing from the scope of the invention as defined by appended claims and their equivalents. The invention can be better understood by reference to the following claims. For purpose of claim interpretation, the transitional phrases "including" and "having" are intended to be synonymous with the transitional phrase "comprising".

What is claimed is:

1. A coupling apparatus for a grain trailer comprising an upper subframe fixed to the underside of a frame of the grain trailer, the upper subframe including a pivot support secured thereto, the pivot support comprising first and second spaced apart bearing support plates,
   a lower plate member pivotably retained to the upper subframe, the lower plate member comprising a kingpin depending therefrom,
   a pair of spaced apart axle receivers fixed to and extending above a skid plate of the lower plate,
   an axle passing through the axle receivers of the lower plate and also through bearings supported in the bearing support plates of the upper subframe,
   the pivot support secured to the upper subframe between a front end wall and an intermediate rib of the subframe,
   the first bearing support plate depending from the front end wall of the upper subframe and the second bearing support plate depending from the intermediate rib of the upper subframe, wherein the lower plate will rock about the axle relative to the upper subframe.

2. A coupling apparatus for a grain trailer wherein a kingpin on the grain trailer is received in a fifth wheel hitch of a truck tractor, comprising:
   a steel upper subframe securely mounted to an underside of a grain trailer body near a front end thereof,
   the grain trailer body constructed of aluminum,
   the upper subframe including a first hinge element depending therefrom,
   a lower plate member including a second hinge element,
   the lower plate member constructed of steel,
   the second hinge element coupled to the first hinge element by at least one axle wherein the second hinge element is pivotable on the first hinge element about a generally horizontal axis defined by the at least one axle,
   the generally horizontal axis generally aligned with a longitudinal centerline of the grain trailer body,
   the lower plate member comprising the kingpin depending therefrom,
   wherein the lower plate will rock about the at least one axle relative to the upper subframe, the lower support plate member includes a skid plate,
the skid plate having a top surface,
the second hinge element fixed to the top surface of the skid plate,
a kingpin receiver disposed generally at a center of the skid plate,
the kingpin received in the kingpin receiver,
the second hinge element comprises two pairs of axle receiving plates upstanding on the top surface of the skid plate,
each axle receiving plate of each pair of axle receiving plates including an axle opening therethrough,
a first of the axle receiving plates of each pair of axle receiving plates spaced a small distance from a second of the axle receiving plates of each pair of axle receiving plates,
the first and second of the axle receiving plates of each pair of axle receiving plates defining a gap therebetween,
the first axle housing of the upper subframe receivable within the gap defined by the first and second of the axle receiving plates of the first pair of axle receiving plates,
the second housing of the upper subframe receivable within the gap defined by the first and second of the axle receiving plates of the second pair of axle receiving plates,
the at least one axle comprises first and second axles receivable in the axle receiving plates and the bearing housings.

3. The coupling apparatus of claim 2 wherein
the upper subframe comprises a front wall and a rear wall interconnected by side walls,
the upper subframe further comprises a first intermediate rib and a second intermediate rib,
each of the first and second intermediate ribs generally parallel to the front wall,
the first hinge element mounted between the first intermediate rib and the front wall,
the upper subframe spaced apart from a front wall of a frame of the grain trailer body.

\* \* \* \* \*